United States Patent [19]
Yoshio

[11] Patent Number: 4,992,885
[45] Date of Patent: Feb. 12, 1991

[54] METHOD OF RECORDING AND REPRODUCING AUDIO INFORMATION IN CORRELATION WITH DIVIDED SCREEN GRAPHICS INFORMATION

[75] Inventor: Junichi Yoshio, Tokorozawa, Japan

[73] Assignee: Pioneer Electronic Corporation, Tokyo, Japan

[21] Appl. No.: 286,718

[22] Filed: Dec. 20, 1988

[30] Foreign Application Priority Data

Jan. 29, 1988 [JP] Japan ................................. 63-18783
Nov. 7, 1988 [JP] Japan ............................... 63-280859

[51] Int. Cl.$^5$ .............................................. H04N 5/76
[52] U.S. Cl. .................................... 358/341; 358/342
[58] Field of Search ...................... 360/19.1, 72.2, 18; 358/343, 341, 342; 369/30, 32

[56] References Cited

U.S. PATENT DOCUMENTS

| 3,913,135 | 10/1975 | Damlamian | 360/18 |
| 4,476,499 | 10/1984 | Kanamaru | 369/32 |
| 4,615,024 | 9/1986 | Usui | 360/32 |
| 4,729,043 | 3/1988 | Worth | 358/347 |
| 4,763,208 | 8/1988 | Kawamura et al. | 358/312 |
| 4,777,537 | 10/1988 | Ueno et al. | 358/342 |
| 4,779,252 | 10/1988 | Custers | 369/32 |
| 4,872,068 | 10/1989 | Ishii et al. | 358/342 |

Primary Examiner—Robert L. Richardson
Attorney, Agent, or Firm—Foley & Lardner, Schwartz, Jeffery, Schwaab, Mack, Blumenthal & Evans

[57] ABSTRACT

At least one group of division screen data is inserted and recorded, together with music data groups, on a disc in each of a plurality of groups of music data which are divided by Q channel data in a subcode in a CD format, and one group of music data group is successively selected and read from the disc. The division screen data group contained in the read music data group is written into the corresponding division screen storage regions, and the written data are read from a total storage region composed of all the division screen storage regions in a prescribed reading sequence, thus providing an image signal representing a total screen composed of division screens indicated by the divided screen data group. Accordingly, a displayed image can be formed or varied to indicate the progress or sequence of audio information as it is progressively reproduced or played back.

10 Claims, 5 Drawing Sheets

Fig. 1
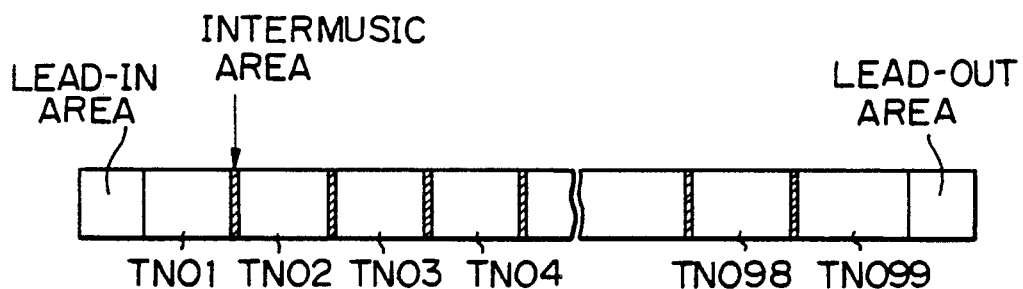
Fig. 2
(a) TNO1 INX1 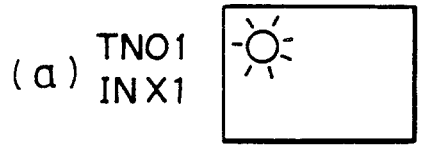
(b) TNO2 INX1 
(c) TNO3 INX5 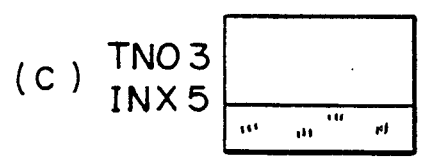
(d) TNO4 INX20 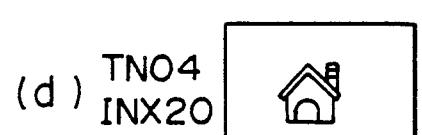
(e) TNO1 INX8 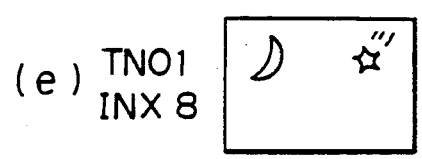
(f) TNO50 INX1 
Fig. 3
| 0 | MODE | ITEM |
|---|---|---|
| 1 | INSTRUCTION ||
| 2 | Q PARITY ||
| 3 |||
| 4 | CHANNEL NUMBER | COLOR DATA |
| 5 |||
| 6 | LOCATION DATA ||
| 7 |||
| 8 | DATA & PARITY ||
| ⋮ |||
| 23 |||

Fig. 7

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | | | PARITY Q | | | |
| 3 | | | | | | |
| 4 | | | COLOR 0 | | | |
| 5 | | | | | | |
| 6 | | | | | | |
| ⋮ | | | | | | |
| 17 | | | | | | |
| 18 | | | COLOR 7 | | | |
| 19 | | | | | | |
| 20 | | | PARITY P | | | |
| ⋮ | | | | | | |
| 23 | | | | | | |

Fig. 8

| SYMBOL | R | S | T | U | V | W |
|---|---|---|---|---|---|---|
| 0 | 0 | 0 | 1 | 0 | 0 | 1 |
| 1 | 0 | 0 | 0 | 0 | 0 | 1 |
| 2 | | | PARITY Q | | | |
| 3 | | | | | | |
| 4 | 0 | 0 | COLOR | | | |
| 5 | 0 | 0 | REPEAT | | | |
| 6 | 0 | 0 | 0 | 0 | 0 | 0 |
| ⋮ | | | | | | |
| 19 | 0 | 0 | 0 | 0 | 0 | 0 |
| 20 | | | PARITY P | | | |
| ⋮ | | | | | | |
| 23 | | | | | | |

METHOD OF RECORDING AND REPRODUCING AUDIO INFORMATION IN CORRELATION WITH DIVIDED SCREEN GRAPHICS INFORMATION

BACKGROUND OF THE INVENTION

1. Field of the Invention

The present invention relates to a method of recording and reproducing audio information, and more particularly to a method of recording and reproducing graphics information together with audio information on and from a disc which is designed to record information according to the so-called CD (Compact Disc) format.

2. Description of the Related Art

Conventional CD graphics information data groups or screen data groups are representative of screen images over the entire screen of a display. When a new screen data group is obtained while a disc is being progressively played back, the image displayed on the screen based on the preceding screen data group is erased and an image according to the new screen data group is displayed on the screen.

There has been a demand for the display of screen images which are formed or varied to show the progress or sequence of audio information as it is progressively reproduced or played back.

SUMMARY OF THE INVENTION

It is an object of the present invention to provide a method of recording and reproducing graphics information to display screen images which are formed or varied to indicate the progress or sequence of audio information as it is progressively reproduced or played.

According to the present invention, there is provided a method of recording and reproducing audio information in relation to graphics information, comprising the steps of: inserting and recording at least one group of divided screen data on a disc in each of a plurality of groups of music data which are divided by Q channel data in a subcode in a CD format; successively selecting and reading one of the music data groups from the disc; writing the divisional screen data group contained in the read music data group in corresponding divisional screen storage regions; and reading the written data from a total storage region composed of all the divisional screen storage regions in a prescribed reading sequence, thus providing an image signal representing a total screen composed of divisional screens indicated by the divisional screen data groups.

The above and other object, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a view showing data zones divided by track numbers;

FIGS. 2(a) through 2(f) are views of examples of images stored as respective data units;

FIG. 3 is a view showing a pack of subcode data;

FIG. 7 is a view showing a preset memory command;

FIG. 8 is a view showing load color lookup table color 0~7 commands;

DETAILED DESCRIPTION OF THE EMBODIMENTS

Subcode data are recorded in a compact disc as follows: According to a subcode format, the recording region on the compact disc, from a lead-in area to a lead-out area is divided into a maximum of 99 data zones by track numbers in a subcode channel Q. Each of the 99 data zones can also be divided in a maximum of 99 data units by indexes in the channel Q. Therefore, the recording region from the lead-in area to the lead-out area can be divided into a maximum 9801 data units. According to the present invention, data for one image are recorded as subcode graphics data in each of the data units. Examples of such images are illustrated in FIGS. 2(a) through 2(f).

In the subcode format, low-order 6 bits out of 8 bits which form a subcode constitute one word, and 98 words are handled as one unit. Two words out of the 98 words are used as a synchronizing signal, and 24 words of each of four equal groups into which the remaining 96 words are divided are handled as a minimum unit (pack) of data and constitute one image processing command. These 24 words in one data pack are constructed as shown in FIG. 3. As shown in FIG. 3, the first word of the 24 words indicate a recording mode, and the second word serves as an instruction word indicative of the type of the image processing command. The instruction word is followed by third and fourth words serving as an error correcting code of Q parity. The fifth and sixth words contain a channel number and color data for designating the color of a screen image. The fifth and sixth words are followed by seventh and eighth words containing location data indicating a data display position within the screen 15 words which follow the location data contain image data and an error correcting code of P parity.

Recording modes include a line graphics mode and a TV graphics modes, for example. Image processing commands include various commands such as a command for displaying an image in a desired one of a finite set of colors in one of screen fonts (in the TV graphics mode, for example, the entire screen is divided vertically into 18 equal portions and horizontally into 50 equal portions, and hence one screen image is made up of a total of 900 screen fonts), and a command for moving a screen image vertically, horizontally, or obliquely.

Figure 4:
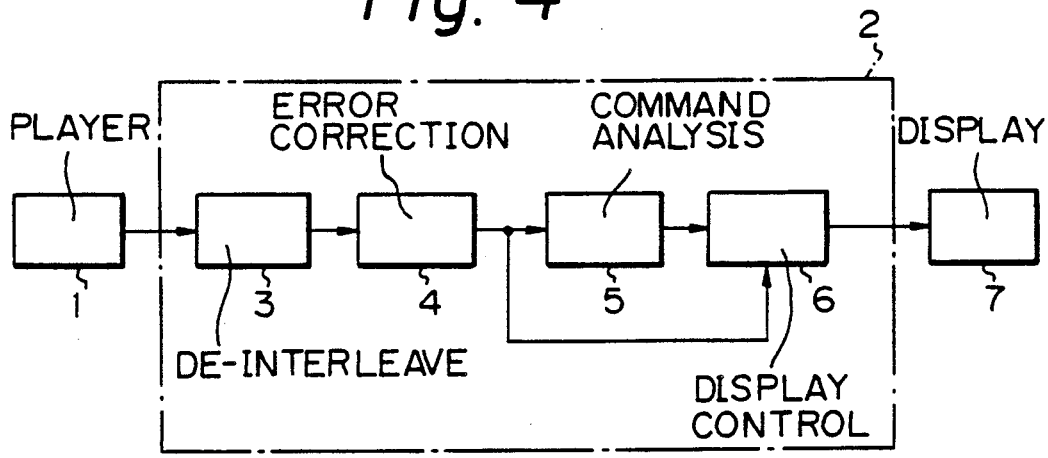
FIG. 4 is a block diagram of an image data reproducing apparatus.

An image reproducing apparatus for reproducing image data recorded as subcode graphics data is shown in FIG. 4. A CD player 1 reads recorded information from a compact disc according to a track number or an index which is designated through a control panel of the CD player 1, and issues 8-bit parallel data forming a subcode at a period of 136 $\mu$sec., for example, as well as an audio signal. The parallel data from the CD player 1 are supplied to a subcode decoder 2. In the subcode decoder 2, the output data from the CD player 1 are first fed to a de-interleaving circuit 3 where the output data which have been interleaved or scrambled when recorded are de-interleaved or unscrambled. The de-interleaved data are then supplied to an error correcting circuit 4 which corrects errors in the data with an error correcting code that has been added to the recorded data. The corrected data are then supplied to a command analyzer 5 and a display control circuit 6. The command analyzer 5 analyzes the instruction word in an image processing command in the 8-bit parallel data, and generates data indicating the colors of pixels of an image, etc., based on the data in the image processing command. The display control circuit 6 includes a frame memory (not shown) for storing image data recorded as the subcode graphics data, generates signals indicative of three primaries of red, green, and blue and a synchronizing signal based on the output data from the command analyzer 5, and supplies the signals to a display unit 7 such as a CRT (cathode-ray tube) display unit. The frame memory is capable of superposing other image data on the previous image data as the previous image data are successively updated by the newly applied image data. Therefore, the display unit 7 displays a composite image.

Figure 5A:
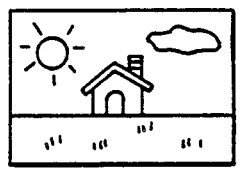
FIGS. 5(a) and 5(b) are views showing examples of images obtained by combining desired images shown in FIGS. 2(a) through 2(f)
Figure 5B:
Figure 6:
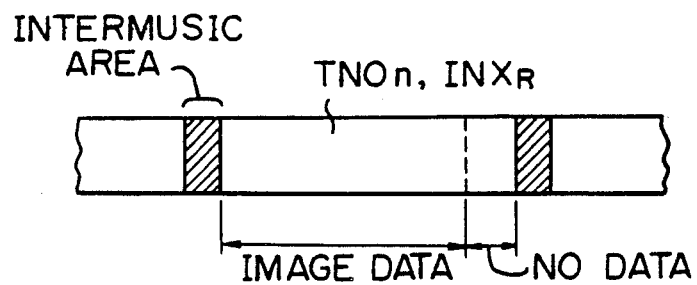
FIG. 6 is a view showing an image data distribution in each data zone.

It is assumed here that the image data shown in FIGS. 2(a) through 2(f) are recorded at addresses (TN01, INX1), (TN02, INX1), (TN03, INX5), (TN04, INX20), (TN01, INX8), and (TN050, INX1), respectively, for data units divided by track numbers (TN00) or indexes (INX). Then, a composite image as shown in FIG. 5(a) can be displayed by successively reproducing a desired combination of image data (TN01, INX1), (TN02, INX1), (TN03, INX5), and (TN04, INX20), for example, according to respective indexes. Another composite image as shown in FIG. 5(b) can also be displayed by successively reproducing another combination of image data (TN04, INX20), (TN01, INX8), and (TN050, INX1).

For recording image data, it is preferable to store the image data so as to terminate immediately before a data zone thereof terminates, with no data stored after the image data, so that one-image data can reliably be reproduced subsequently.

In the above description, one-image data do not contain a command for initializing the stored contents of the frame memory. Without such a command, however, no image would be specified in an area in the screen and an unsightly image would be reproduced until a composite image is completed. To avoid this problem, a preset memory command is inserted in each one-image data for initializing the stored contents of the frame memory, and only the preset memory command in the one-image data to be reproduced first is executed, but the preset memory commands in the image data to be reproduced subsequently are not executed.

A preset memory command is constructed as shown in FIG. 7, and serves to set all fonts in the memory to one of 16 colors which corresponds to the color number designated by 4 bits in channels T through W at a symbol 4. The preset memory command is repeated successively 16 times, the number of repetition being represented by 4 bits in the channels T through W at a symbol 5.

The 16 colors corresponding respectively to the color numbers "0" through "15" are set by load color lookup table (CLUT) colors 0 through 15. The load color lookup table colors 0 through 15 are constructed as shown in FIG. 8, and serve as a command for setting the contents of a color lookup table which indicates the color of the color number in a preset command. While a total of 16 colors are required to be designated, since there are 4 bits for each of the colors of R, G, B, two symbols are necessary for setting one color, and only 8 colors can be set by one pack. Therefore, this command is divided into two commands for designating 8 colors in the first half and 8 colors in the second half, respectively.

The instruction word for the 8 colors in the first half, i.e., colors 0 through 7, whereas the instruction word for the 8 colors in the second half, i.e., colors 8 through 15 is "31". Red to be mixed with each color number is indicated by 4 bits in channels R through U at an even-numbered symbol allotted to the color number. Green to be mixed with each color number is indicated by a total of 4 bits including 2 bits in channels V, W following the channels R through U at an even-numbered symbol, and 2 bits in channels R, S in a next odd-numbered symbol. Blue to be mixed with each color number is indicated by 4 bits in channels T through W following the channels R, S. Since there are $2^4 (=16)$ gray scales for each color, and there are three primary colors of R, G, B available, it is possible to obtain $16^3 (=4096)$ color mixtures. The gray scale "0000" indicates the darkest condition, and the gray scale "1111" represents the brightest condition.

Figure 9:
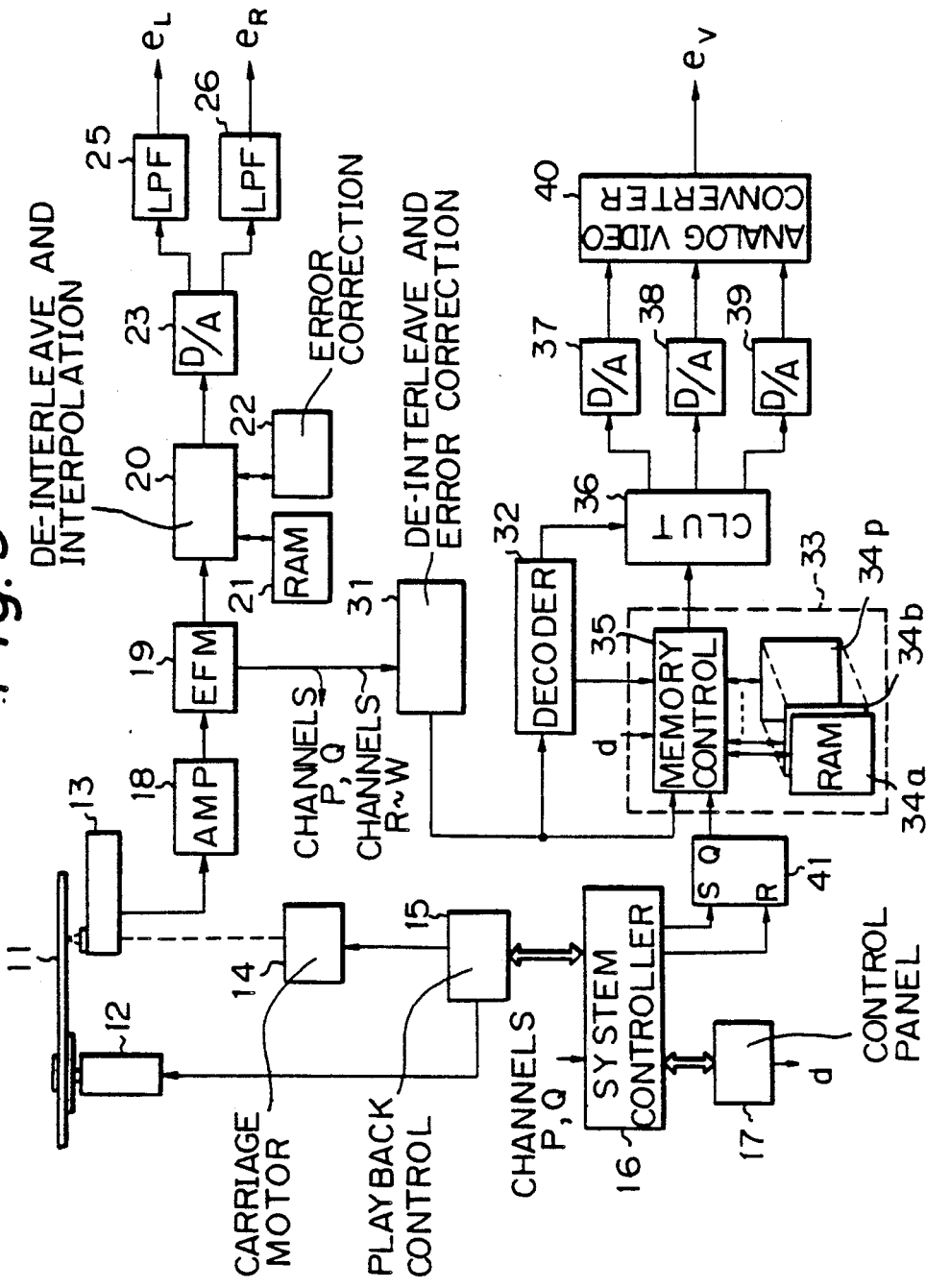
FIG. 9 is a block diagram of another image data reproducing apparatus.

FIG. 9 shows in block form an apparatus for reproducing images based on image data with a preset memory command inserted in each one-image data.

As shown in FIG. 9, a compact disc 11 is rotated by a spindle motor 12. When the disc 11 is rotated, a signal recorded on the disc 11 is read out by a pickup 13. The pickup 13 is supported on a carriage (not shown) which is movable radially across the disc 11 by a carriage motor 14 for positioning an information reading spot (i.e., a light beam spot) from the pickup 13 radially on the disc 11. The spindle motor 12, the pickup 13, and the carriage motor 14 are associated with various servo systems such as a spindle servo system, a focus servo system, a tracking servo system, and a carriage servo system. Since these servo systems are well known in the art, they are omitted from illustration in FIG. 9.

The spindle motor 1 and the carriage motor 14 are energized by a playback control circuit 15 through the spindle servo system and the carriage servo system, respectively. The playback control circuit 15 is responsive to a command from a system controller 16 for driving the spindle motor 12 and the carriage motor 14 and turning on and off the various non-illustrated servo systems.

An RF (radio-frequency) signal issued from the pickup 13 is amplified by an RF amplifier 18, and the amplified signal is supplied to an EFM (eight-to-fourteen modulation) circuit 19. The EFM circuit 19 modulates a pulse signal obtained by slicing the RF signal to provide PCM data, i.e., digital data including time-sharing multiplexed audio information in left and right channels and also a subcode. The digital data issued from the EFM circuit 19 are supplied to a de-interleaving and interpolating circuit 20. The de-interleaving and interpolating circuit 20 coacts with a RAM 21 to de-interleave or unscramble the digital data which have been interleaved or scrambled, supplies the de-interleaved digital data to an error correcting circuit 22, and interpolates error data in output data from the error correcting circuit 22 by way of linear interpolation when a signal indicating an error impossible to correct is issued from the error correcting circuit 22. The error correcting circuit 22 corrects error data with the CIRC (Cross Interleave Reed Solomon Code), supplies the corrected data to the de-interleaving and interpolating circuit 20, and issues a signal indicating an error impossible to correct when the data cannot be corrected.

Output data from the de-interleaving and interpolating circuit 20 are fed to a D/A (digital-to-analog) converter 23. The D/A converter 23 has a de-multiplexer for separating, into the left and right channels, the digital data containing the time-sharing multiplexed audio information for the left and right channels. The D/A converter 23 thus reproduces audio signals $e_L, e_R$ for the left and right channels. The reproduced audio signals $e_L, e_R$ are supplied to audio output terminals after unwanted components have been removed therefrom by respective LPFs (low-pass filters) 25, 26.

2 bits in channels P, Q of the subcode issued from the EFM circuit 19 are supplied to a system controller 16, and 6 bits in channels R through W are supplied to a de-interleaving and error correcting circuit 31. The system controller 16 comprises a microcomputer including a processor, a ROM, a RAM, and a timer. After the system controller 16 has effected an arithmetic operation based on data or a program stored in the ROM and RAM in response to a keyboard command entered through a control panel 17, the system controller 16 supplies a playback command signal, a jump command signal, etc., to the playback control circuit 15.

The de-interleaving and error correcting circuit 31 de-interleaves the 6 bits in the channels R through W and corrects an error with parity Q, P. Output data from the de-interleaving and error correcting circuit 31 are supplied to a mode/instruction decoder 32. The mode/instruction decoder 32 decodes a mode represented by 3 bits in the channels R through T at a symbol 0 in each pack, and an instruction represented by 6 bits in the channels R throuqh W at a symbol 1 in each pack, and supplies signals indicating the mode and the instruction to various circuit components.

Output data from the de-interleaving and error correcting circuit 31 are supplied to an image memory device 33. The image memory device 33 has addresses corresponding to all the pixels on the screen which contains the horizontal 50 fonts and the vertical 18 fonts. The image memory device 33 comprises 16 RAMs 34a through 34p for storing 4-bit data at each of the addresses, and a memory control circuit 35 for detecting data indicating the color number of each pixel in each image channel in the output data from the de-interleaving and error correcting circuit 31 dependent on the mode and command from the mode/instruction decoder 32, for writing the detected data at corresponding addresses in the RAMs 34a through 34p, and for successively reading out one stored content corresponding to the designated image channel in a prescribed sequence in response to keyboard data d entered through the control panel 17.

The memory control circuit 35 of the image memory device 33 is supplied with a high-level preset inhibit signal from the Q output terminal of a flip-fop 41. When no preset inhibit signal is supplied, and when the output from the mode/instruction decoder 32 indicates a preset memory command, the memory control circuit 35 writes data representing the color number designated by the present memory command in all the addresses in the RAMs 34a through 34p. When a preset inhibit signal is supplied, and when output from the mode/instruction decoder 32 indicates a preset memory signal, the memory control circuit 35 does not write the data. Set and reset signals for the flip-flop 41 are issued from the system controller 16.

Data issued from the image memory device 33 are supplied to a color lookup table (CLUT) 36. The CLUT 36 detects commands for load CLUT colors 0 through 7 and commands for load CLUT colors 8 through 15 of the output data from the de-interleaving and error correcting circuit 31 dependent on the mode and command indicated by the output of the mode/instruction decoder 32, holds the color data corresponding to the color numbers, and selects, from the color data thus held, and outputs the color data of the color number represented by the data read out of the image memory device 33.

The output data from the CLUT 36 are composed of three data each representing the level of the color signal of one of R, G, B with 4 bits. The three data representing the levels of the R, G, B color signals are then supplied to respective D/A converters 37, 38, 39 by which the data are converted into analog signals. The analog output signals from the D/A converters 37, 38, 39 are then applied to an analog video converter 40. The analog video converter 40 produces a luminance signal and two color difference signals based on the output signals from the D/A converters 37, 38, 39, produces a carrier color signal by adding signals produced by the balanced modulation of two color subcarriers having a phase difference of 90° with the two color difference signals, and generates an NTSC video signal $e_V$ by adding the carrier color signal to the luminance signal and also adding a synchronizing signal. The output signals from the D/A converters 37, 38, 39 are thus converted into the video signal $e_V$ by the analog video converter 40.

Figure 10:
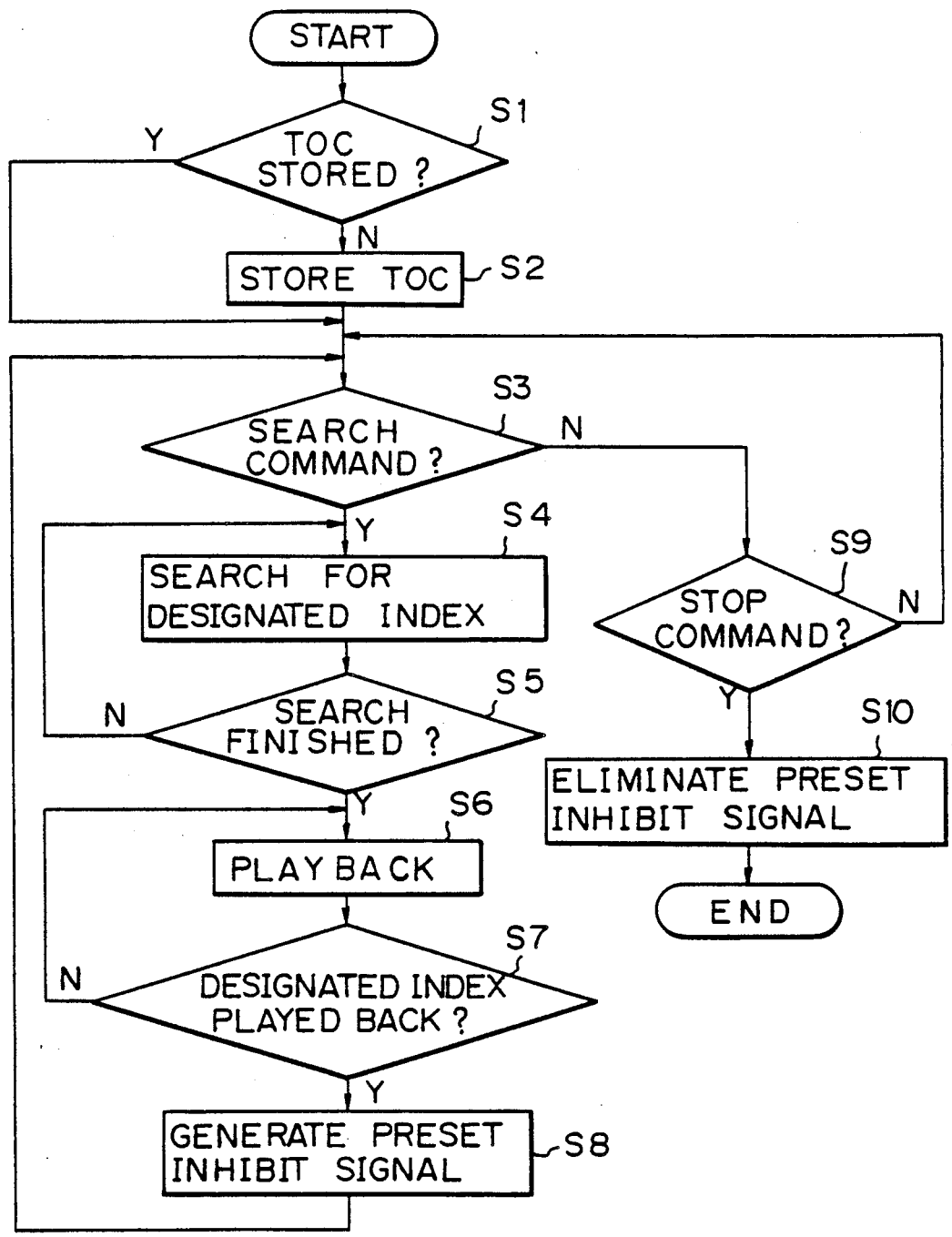
FIG. 10 is a flowchart of an operation sequence of a processor in the image data reproducing apparatus.

An operation sequence of the processor in the system controller 16 will be described with reference to the flowchart of FIG. 10.

When a composite image generation signal is issued from the control panel 17 while a main routine is being executed, operation of the processor goes to a step S1 to determine whether data called TOC (Table of Contents) recorded as a subcode in an inner peripheral area of the disc 11 have already been read out and stored in an area in the RAM in the system controller 16. If no TOC is stored in the area in the RAM in the step S1, then the processor issues a command for reading the TOC from the inner peripheral area of the disc 11 to the playback control circuit 15, receives the TOC obtained as Q channel data in the subcode issued from the EFM circuit 19, and stores the TOC in the RAM in a step S2. After the step S2, the processor determines whether a search command has been issued from the control panel 17 in a step S3. If the TOC has already been stored in the RAM in the step S1, then the processor jumps from the step S1 to the step S3.

If a search command has been issued from the control panel 17 in the step S3, then the processor calculates the number of tracks up to an index designated by data supplied from the control panel 17 with the search command, based on the TOC stored in the RAM, and gives the playback control circuit 15 a jump command over the calculated number of tracks in a step S4. Thereafter, the processor determines whether the designated position has been reached, i.e., the search process has been finished, based on the track number and the index obtained by the group of bits in the channel Q in the subcode in a step S5. If the search process is not completed in the step S5, then the processor goes back to the step S4. If the search process is completed in the step S5, then the processor applies a playback command signal to the playback control circuit 17 in a step S6. After the step S6 has been executed, the processor determines whether the reproduction of the designated index has been finished or not in a step S7. If the reproduction of the designated index has been finished in the step S7, then the processor applies a set signal to the flip-flop 41 to enable the latter to produce a preset inhibit signal in a step S8, and thereafter control returns from the step S8 to the step S3.

If no search command is issued in the step S3, then the processor determines whether a stop command has been produced by the control panel 17 in a step S9. If no stop command has been issued in the step S9, then the processor returns to the step S3. If a stop command has been generated in the step S9, the processor applies a reset signal to the flip-flop 41 to eliminate the preset inhibit signal in a step S1O, and then resumes the main routine which had been executed before the step S1 was executed.

In the steps S3 through S8, the information recorded at the index designated by the data representing the track number and the index number which are issued with the search command from the control panel 17 each time a search command is given, i.e., the digital data containing the audio information and the image data inserted as the subcode, is read out. When the image data recorded at the first designated index are read out, no preset inhibit signal is generated as control has not passed through the step S8, and hence the data stored at all the addresses in the RAMs 34a through 34p in the memory device 33 become data indicating the designated color number according to the preset memory command inserted in the image data recorded at the first designated index.

Thereafter, a preset inhibit signal is generated in the step S8. When a subsequently designated index is reproduced, the RAMs 34a through 34p in the memory device 33 are not preset, and composite images as shown in FIGS. 5(a) and 5(b) are obtained.

The method of the present invention can be employed in the following applications other than the aforesaid embodiment: The method of the invention may be used as a design assisting tool for generating a new design pattern, crest pattern, and other patterns by recording geometric patterns as image data on a disc, selecting some of the recorded geometric patterns, and successively reproducing the selected patterns. Moreover, the invention may be used in an apparel-related application in which garments of one design with different colors or patterns may be successively displayed and while they are being displayed their images may be explained by audio data, thus providing a catalog of wears of different colors and designs with audio explanations.

Another use of the method may be as a puzzle for successively combining images in a certain order until a certain image is finally obtained. More specifically, 100 individual meaningful images, for example, are successively displayed and superposed in a correct order, and image fragments which remain displayed without being eliminated by superposing images will make up a final image. Alternatively, when each image is reproduced, audio data associated therewith may be reproduced as its explanation, hint, or other information. That is, when images are successively reproduced in a correct sequence, associated audio data are reproduced as a hint related to the correct sequence of the images. For example, a melody is used as a hint in such a manner that images associated with fragments of the melody can be combined into a final complete image only if the melody fragments are so joined as to reproduce the melody.

In the above embodiment, a compact disc has been described as a disc for recording information according to a CD format. However, the present invention is also applicable to a subcode area in a composite disc known as a CDV which has a digital audio area and a video area.

With the present invention, as described above, at least one group of division screen data is inserted at the subcode part of each of a plurality of groups of music data which are divided by Q channel data in a subcode in a CD format, and one group of music data group is successively selected and read from the disc. The division screen data group contained in the read music data group is written into the corresponding division screen storage regions, and the written data are read from a total storage region composed of all the division screen storage regions in a prescribed reading sequence, thus providing an image signal representing a total screen composed of division screens indicated by the division screen data group. Accordingly, a displayed image can be formed or varied to indicate the progress or sequence of audio information as it is progressively reproduced or played back.

Although certain preferred embodiments have been shown and described, it should be understood that many changes and modifications may be made therein without departing from the scope of the appended claims.

What is claimed is:

1. A music and graphics information storage and reproducing system comprising:
    storage means for storing therein an information signal including a plurality of music data groups and a plurality of graphics data groups distributed along the same time axis as said music data groups,
    said graphics data groups including a first type of divided screen data group and at least one separate second type of divided screen data group defining a complement of said first type of divided screen data group to form a single-frame image; and
    means responsive to both said types of divided screen data groups for providing an output signal representing said single-frame image.

2. A system as claimed in claim 1, wherein said music data groups are stored in said storage means as a main code in a CD format.

3. A system as claimed in claim 2, wherein said graphics data groups are stored in said storage means as a subcode in said CD format.

4. A system as claimed in claim 1, wherein said means for providing an output signal comprises:
    means for selectively reading at least one of said music data groups from said storage means for providing a music output;
    memory means;
    means for reading at least one of said first type of divided screen data group and at least one of said second type of divided screen data group from said storage means for separate storage in said memory means; and means for sequentially reading said first type of divided screen data group and said second type of divided screen data group, respectively, from said memory means for providing as said output signal, a single-frame image signal comprising said first and second types of data groups in correlation with said music output.

5. A system as claimed in claim 1, wherein said means responsive includes means for providing at least a respective one of said plurality of music data groups in correlation with a display of said single-frame image on a single screen.

6. A method of storing and reproducing music and graphics information comprising the steps of:
recording an information signal including a plurality of music data groups and a plurality of graphics data groups distributed along the same time axis as said music data groups,
said graphics data groups including a first type of divided screen data group and at least one separate second type of divided screen data group defining a complement of said first type of divided screen data group to form a single-frame image; and
reading both said types of divided screen data groups for providing an output representing said single-frame image.

7. A method as claimed in claim 6, wherein said music data groups are recorded as a main code in a standard CD format.

8. A method as claimed in claim 7, wherein said graphics data groups are recorded as a subcode in said CD format.

9. A method as claimed in claim 6, wherein said reading step comprises:
selectively reading successive ones of said music and graphics data groups;
writing said graphics data read from said successive ones of said graphics data groups into corresponding regions of a memory; and
sequentially reading both said types of divided screen data groups from said memory to form an image signal representing a single-frame image.

10. A method as claimed in claim 6, wherein said reading step includes reading and providing at least a respective one of said plurality of music data groups in correlation with displaying said single-frame image on a single screen.

* * * * *